United States Patent [19]

Hansen

[11] Patent Number: 5,577,660
[45] Date of Patent: Nov. 26, 1996

[54] TEMPERATURE SENSING AUTOMATIC FAUCET

[76] Inventor: K. Gene Hansen, 8935 Kings Hill Dr., Sandy, Utah 84093

[21] Appl. No.: 352,523

[22] Filed: Dec. 9, 1994

[51] Int. Cl.$^6$ .................................................. G05D 23/13
[52] U.S. Cl. ..................... 236/12.12; 4/677; 251/129.04
[58] Field of Search .................... 251/129.04; 236/12.11, 236/12.12, 12.1; 4/676, 677

[56] References Cited

U.S. PATENT DOCUMENTS

| | | | |
|---|---|---|---|
| 3,480,787 | 11/1969 | Johansen | 250/221 |
| 3,576,277 | 4/1971 | Blackmon | 222/221 |
| 4,406,401 | 9/1983 | Nettro | 236/12.12 X |
| 4,682,628 | 7/1987 | Hill | 137/624.11 |
| 4,688,277 | 8/1987 | Kakinoki et al. | 4/623 |
| 4,767,922 | 8/1988 | Stauffer | 250/221 |
| 4,886,207 | 12/1989 | Lee et al. | 236/12.12 |
| 4,928,732 | 5/1990 | Hu | 137/607 |
| 5,032,992 | 7/1991 | Bergmann | 236/12.12 X |
| 5,050,641 | 9/1991 | Shwu-Fen | 137/607 |
| 5,062,164 | 11/1991 | Lee et al. | 4/194 |
| 5,074,520 | 12/1991 | Lee et al. | 251/40 |
| 5,095,941 | 3/1992 | Betz | 137/552 |
| 5,309,940 | 5/1994 | Delabie et al. | 137/607 |

FOREIGN PATENT DOCUMENTS

| | | |
|---|---|---|
| 0387471 | 9/1990 | European Pat. Off. . |
| 0282309 | 12/1987 | Japan ................... 236/12.12 |
| 2226104 | 6/1990 | United Kingdom . |
| 2226105 | 6/1990 | United Kingdom . |
| 2255625 | 11/1992 | United Kingdom . |

OTHER PUBLICATIONS

Ad slick "The Delany Sensor–Faucets", Coyne and Delany Co., Charlottesville, VA.

*Primary Examiner*—William E. Wayner
*Attorney, Agent, or Firm*—Prince, Yeates & Geldzahler

[57] ABSTRACT

An automatic temperature regulating system for a faucet, especially an automatic faucet in which water flow is activated by a touchless switch, is constructed to operate so as to compensate for lag time of hot water arriving from the hot water supply. The apparatus includes at least one temperature sensor, this first sensor being disposed in the hot water supply line upstream of the hot water valve. A more sophisticated apparatus includes a second-temperature sensor disposed for sensing the temperature of the outlet water. Methods of automatically regulating temperature of output water from a remote-activated or touchless-switch-activated outlet to compensate for lag in arrival of hot water from the hot water source, are also described.

10 Claims, 5 Drawing Sheets

TEMPERATURE SENSING AUTOMATIC FAUCET

BACKGROUND OF THE INVENTION

1. Field of the Invention

This invention relates to automatic faucets and particularly to improved temperature control of the water flow from such faucets.

2. State of the Art

Automatic faucets, in which the water flow is started and stopped according to the presence of a user's hands near the faucet, are known. Examples include the following U.S. Pat. Nos. 5,074,520, 5,062,164, and 4,886,207 to Lee et al., U.S. Pat. No. 5,309,940 to Delabie et al., U.S. Pat. No. 4,682,628 to Hill, U.S. Pat. No. 5,095,941 to Betz, U.S. Pat. No. 4,928,732 to Hu, U.S. Pat. No. 5,050,641 to Shwu-Fen, U.S. Pat. No. 4,688,277 to Kakinoki et at., U.S. Pat. No. 4,767, 922 to Stauffer, U.S. Pat. No. 3,480,787 to Johansen, and U.S. Pat. No. 3,576,277 to Blackmon. Additionally, UK patent publications Nos. 2 226 105 A by Wu, 2 226 104 A by Wu, and 2 255 625 A by Bosch, and European patent publication No. 0 387 471 A2 by Nilsson and Maattanen also disclose automatic faucets.

However, most prior art automatic faucets have disadvantages. In some cases, installation of the faucet requires construction of additional plumbing and/or electrical lines, making retrofitting of conventional faucets expensive and tedious. In other cases, the temperature of the water from the faucet is not satisfactorily regulated.

First, the water standing in a hot water line prior to the faucet being turned on will typically be cooler in temperature than the hot water supply. Thus, if the desired outlet water temperature is warm or hot, a higher proportion of flow from the hot water valve is needed to produce outlet water of the desired set temperature when the faucet is first turned on. In a conventional manually operated faucet, the user compensates by first opening the hot water all the way, and then as the temperature of the outlet water rises, reducing the hot water flow and opening the cold water valve. However, in a faucet which is activated by a touchless switch, the user cannot, or does not wish, to manually adjust the flows of hot and cold water.

In many automatic faucets, the relative flows of hot and cold water are fixed over the period of activation. That is, when the faucet is turned on, the hot and cold valves open to respective positions computed to provide water of the set temperature assuming that the hot water is at the temperature of the hot supply. Thus, the water which initially leaves the outlet is usually colder than the set temperature. Especially in winter, or if the plumbing is proximal to air-conditioning or refrigeration units, this temperature can be unpleasantly cold. If the period of use is brief, the water at the outlet may never reach the set temperature. If the user tries to wait for hotter water to arrive, water is wasted. In many areas of the country water conservation is a high priority. Or, if the user removes his hands from the faucet area while waiting for warmer water to arrive, the flow of water may be turned off by the automatic sensor.

Further, most such faucets have temperature sensors only in the mixing area downstream of both the cold and hot inputs. A sensor so located will sense a cool or cold temperature when the water flow is activated, and typically the faucet will respond by increasing the proportion of hot water coming to the mixing area. This can result in an overshoot in temperature of the water delivered from the spout, to a temperature that is painfully hot and even scalding. Again responding only to the temperature of the mixing area, the faucet may overcompensate downward, delivering water that is cooler than the set or desired temperature. Thus, the temperature of the water at the output of the faucet may fluctuate initially between too hot and too cold, before finally achieving the set output temperature.

Accordingly, a need remains for an automatic mixing faucet apparatus which delivers water at a uniform preset temperature throughout the period of activation, without large over- or under-shoots and which follows changes in the temperature of water in the hot water line immediately upstream of the mixing area. A need also remains for a temperature regulating system for an automatic faucet, which compensates for the lag time of arrival of hot water. It is desirable that the automatic faucet apparatus and the temperature regulating system should be easily retrofitted to a conventional faucet.

SUMMARY

The invention comprises an automatic temperature regulating system for a faucet in which water flow is activated by a touchless switch, and an automatic faucet apparatus including the automatic temperature regulating capabilities. The invention also provides a method of automatically regulating temperature of output water from a remote-activated or touchless-switch-activated outlet, which compensates for lag time of hot water arriving from the hot water supply. In a preferred embodiment, the automatic temperature regulating system provides for selection of the preset temperature of the output water by a user.

A basic automatic faucet system includes a hot water line, a cold water line, a mixing region to which the hot and cold water lines are connected, and a spout or outlet connected downstream of the mixing region, which delivers a flow of water to a user location such as a basin. A hot water valve controls the flow of hot water into the mixing region, and a cold water valve similarly controls the flow of cold water. A touchless switch sensor is disposed for sensing an object such as a user's hands in a command location. The sensor location will typically, though not necessarily, be proximal to or identical to the user location.

In the temperature regulating system of the invention, a first temperature sensor is located to sense the temperature of water in the hot water line just upstream of the mixing region. A controller is connected to receive signals from the first temperature sensor and the touchless switch, and to control the hot and cold water valves. The controller computes hot and cold water valve settings to achieve a preselected temperature, and activates the hot and cold water valves to the appropriate settings. The controller is further constructed to determine the hot and cold water valve settings according to whether the temperature at the first temperature sensor is within an acceptable range of the expected hot water source temperature. If not, due to cool water standing in the pipes, the controller reduces or stops the cold water flow until the first temperature reaches the expected hot water temperature.

Optionally but desirably, a second temperature sensor is located to sense the temperature of water in the mixing region. In this embodiment, the controller is further constructed to vary the respective flows of hot and cold water to bring the second temperature to the preset outlet temperature, using the temperature information provided by both temperature sensors. The controller is particularly constructed to compensate for the lag time of arrival of hot water in the mixing zone from the hot water source.

In a preferred embodiment the automatic temperature regulating faucet apparatus, including hot and cold water valves, temperature sensors, touchless switch and controller, is constructed for retrofitting to a conventional faucet installation without requiring additional water lines or electrical lines other than standard 120 volt AC.

BRIEF DESCRIPTION OF THE DRAWINGS

In the drawings, which illustrate what is presently regarded as the best mode of carrying out the invention.

DETAILED DESCRIPTION OF THE ILLUSTRATED EMBODIMENT

Figure 1:
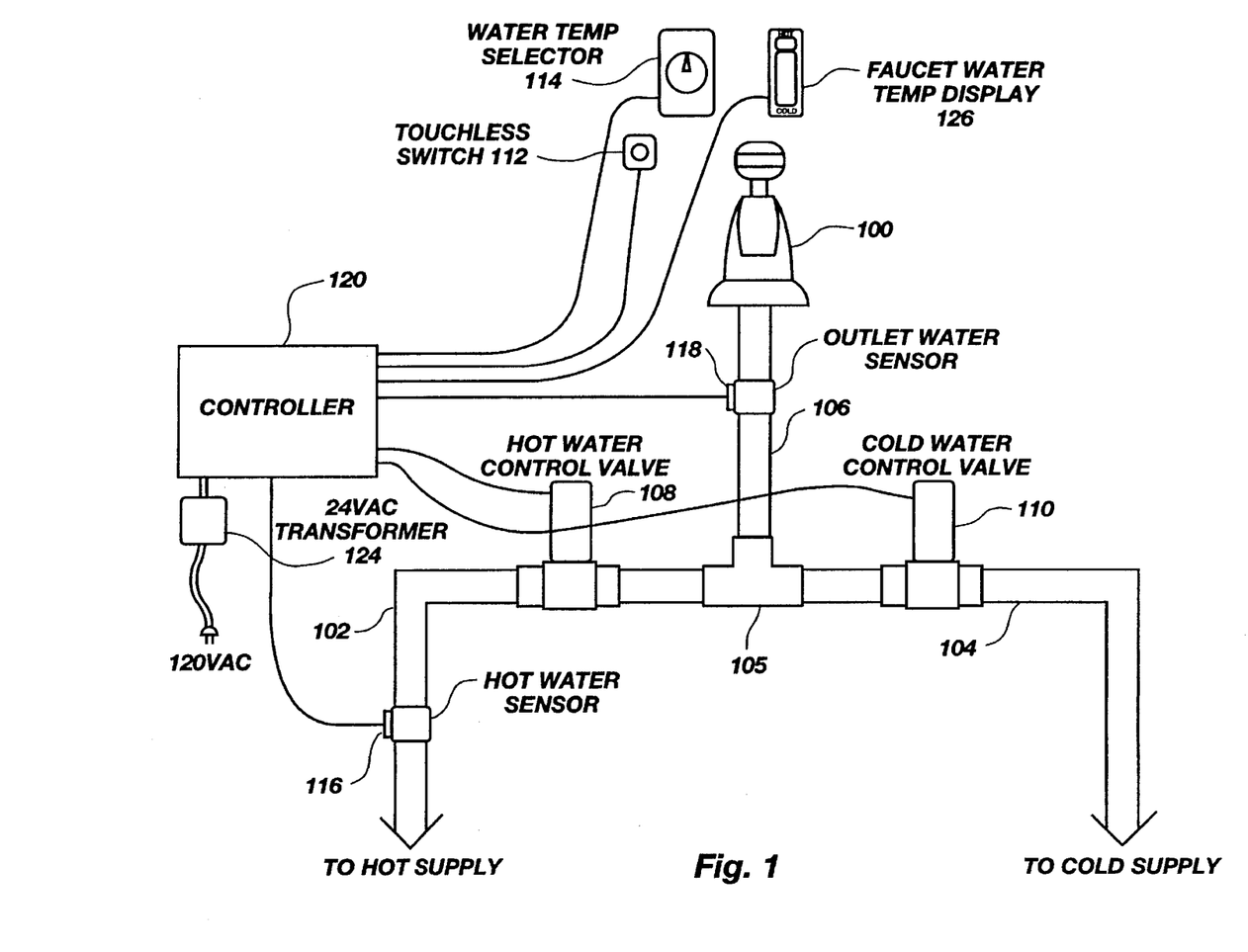
FIG. 1 is a schematic diagram of a faucet system of the invention.

As shown in FIG. 1, a preferred embodiment of an automatic faucet system with adjustable automatic temperature regulating capability includes an outlet or spout 100 connected to a hot water line 102 and a cold water line 104. Hot water line 102 and cold water line 104 connect at a "T" junction 105 to an outlet segment 106, which terminates in the spout 100. Junction 105 and outlet segment 106 together constitute a mixing zone, in which flows of water from the hot and cold water lines combine before exiting the spout. A hot water control valve 108 controls a flow of water from a hot water supply (not shown), and a cold water control valve 110 controls a flow of water from a cold water supply (also not shown). A touchless switch 112 is positioned for activation by a user whose hands are in the vicinity of the spout 100. A water temperature selector 114 is positioned near the user location or sink (not shown) into which water flows from the spout 100. A first temperature sensor 116 is disposed in the hot water line 102 upstream of the hot water control valve 108. A second temperature sensor 118 is disposed in the mixing zone downstream of the junction 105.

A controller 120 is communicatively connected to receive and/or read signals from the touchless switch 112, from the temperature selector 114, and from both temperature sensors 116, 118. Controller 120 is also connected to control the hot water valve 108 and the cold water valve 110, and to receive electrical power from an electrical power source which is here embodied as a conventional 120-volt AC outlet 122, modified with a 24 volt AC transformer 124.

Controller 120 is constructed to activate hot water valve 108 and cold water valve 110 in response to receipt of an "on" signal from the touchless switch 112. Controller 120 is further constructed to regulate the temperature of the outlet water by varying the respective amounts of water flowing through hot water valve 108 and cold water valve 110 in accordance with the values of hot water temperature and outlet water temperature read respectively by the hot water sensor 116 and the outlet water sensor 118. The controller varies the relative flows from the hot and cold water valves so as to compensate for the lag time of hot water arriving from the hot water supply.

The controller determines the initial hot and cold valve settings using the temperatures detected in the hot water fine by sensor 116 and in the mixing zone by sensor 118. As the faucet stays on and hotter water from the hot water supply reaches the sensor 116, the controller changes the valve settings to decrease the proportion of hot water flow. The temperature regulation process which the controller is constructed to follow also includes a feedback-loop-type process based on the temperature sensed by sensor 118 near the outlet. The operation of controller 120 is described in greater detail subsequently, with reference to the flow chart of FIG. 2.

Desirably, the faucet apparatus further includes a water temperature display 126, which displays the temperature detected by sensor 118 near the spout 100. The temperature display may be connected to the controller as shown in FIG. 1, or alternatively may be connected directly to the sensor 118. By observing the temperature reading of the display 126, a user can wait until the water temperature reaches a comfortable level before immersing his hands.

The hot water and cold water valves 108, 110 are variable-flow valves constructed to provide selectable flow rates. In a working model of the embodiment of FIG. 1, the VA-8051 solenoid-actuated valve from Johnson Controls, 2255 South Technology Parkway, West Valley City, Utah 84119, is used. However, variations of the apparatus using other types of valves such as continuous, duty-cycle, or incrementally-controlled valves, are within contemplation.

The touchless switch 112 can be any suitable touchless switch compatible with the environment of the faucet, as known in the art. Known types of touchless switches include active infrared switches, in which the user's hand reflects a standing infrared beam into an infrared light detector; passive infrared switches, in which a user's hand blocks an infrared beam from reaching an infrared detector; and inductive triggers. In a working model of the system of FIG. 1, a Radio Shack Invisible Beam Entry Alert, catalog #49-311 switch is used. Another suitable Radio Shack switch is the Pulsed Infrared Invisible Beam Intrusion Sensor, catalog #49-551A. A touchless switch with a sensor which may be attached directly to the faucet outlet is another useful choice.

The controller can be any suitable logic chip having the necessary inputs and outputs for communicating with the temperature sensors, valves, and touchless switch, and programmable to execute the functions as outlined. The controller has code directing execution of temperature regulation physically embedded within it, as known to those of skill in the art. In the present working embodiment, the controller is a DS5000 microcontroller chip available from Systronix, Inc, Salt Lake City, Utah. However, other types of chip such as a discrete logic chip, or a custom-designed chip, could be used.

Figure 2:
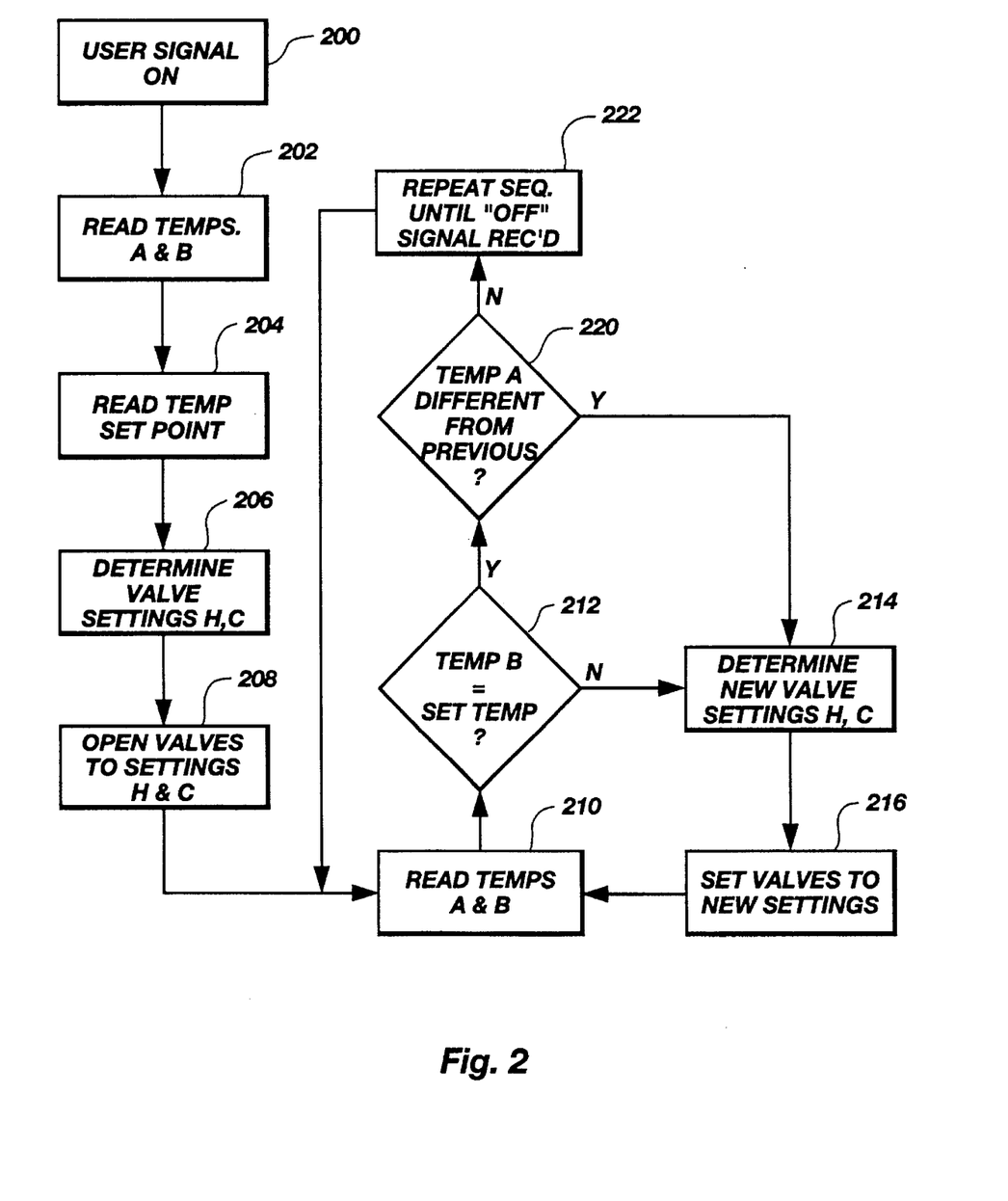
FIG. 2 is a flow chart of one embodiment of the operation of the faucet system of FIG. 1.

FIG. 2 outlines the steps of one embodiment of a temperature regulating method or process which the controller 120 may be constructed to execute. The process is initiated by the controller upon receipt of an "on" signal from the touchless switch indicating that water flow is to be activated (step 200). The controller then reads temperatures A and B from sensors 116 and 118, respectively, and also reads the temperature set point from the water temperature selector 114 (steps 202 and 204). Steps 202 and 204 may be performed in the reverse order. Next, the controller determines initial valve settings H and C, which respectively are the settings for the hot water valve and for the cold water valve which should result in the mixed, output water having the desired set point temperature, based on the temperatures A and B (step 206). The controller then signals the hot and cold valves to open to their respective initial valve settings (step 208).

In step 210, the controller reads the temperatures A of the hot water and B of the output water. The controller then asks whether B differs significantly from the set temperature (step 212), and if "Yes", the controller goes on to determine new valve settings H and C using the new readings of A and B (step 214). Continuing on this branch, the controller then signals the hot and cold valves to operate according to the new valve settings (step 216). Following step 216, the controller returns to step 210.

Alternatively, if in step 212 the answer is "No", the controller asks whether the new value of A differs significantly from the immediately previous value of A (step 220). If "Yes", the controller goes on to steps 214 and 216, determining new valve settings and setting the hot and cold water valves to those settings. The controller thus cycles through the steps of checking the temperatures of the two sensors and comparing output temperature B to the temperature set point, until an "off" signal is received from the touchless switch indicating that the water flow is to be terminated. The manner by which triggering of the "off" signal is accomplished varies according to the type of touchless switch used and the specific instructions embedded in the microcontroller, as will be apparent to those of skill in the art. In response to the "off" signal, the controller closes both the hot and cold water valves.

The steps 206 and 214 of determining valve settings can be performed in different ways. For example, the settings can be determined from a two-dimensional temperature table which cross-correlates the hot water temperature (temperature A), the cold water temperature and the temperature set point (the desired output temperature), with the settings for both the hot and cold water valves. The cold water temperature could be assumed to be a typical "room temperature water" value, a different value according to the local environment, such as 55° F. which is an average normal temperature of underground waterlines. Or the initial temperature of water standing in the mixing zone (temperature $B_o$ sensed by sensor 118 at the time the "on" signal is received) could be used as the cold water temperature. The look-up table can be constructed empirically, or by using an algorithm which takes into account the volumes of hot and cold water flow for particular valve settings, as will be apparent to the typical skilled artisan. A temperature table constructed using an algorithm could also be refined by empirically testing the system.

In a highly refined embodiment, there could be a third temperature sensor disposed in the cold water line, and the controller would be connected to read this third temperature sensor. An algorithm for this situation would use the cold water temperature in addition to the hot water temperature and the set point temperature. A temperature table for such an embodiment would be a three-dimensional look-up table.

Alternatively, the controller could itself be constructed to compute the valve settings from the set point temperature and hot water temperature A using an appropriate algorithm. The algorithm could be refined for systems having different water flow volumes and by empirical tests. Extension to the more sophisticated version having the third temperature sensor in the cold water line would be a simple matter for the skilled artisan. However, at present the two-sensor system is preferred, as it is less expensive and will produce adequate temperature regulation in most faucet systems.

Figure 3:
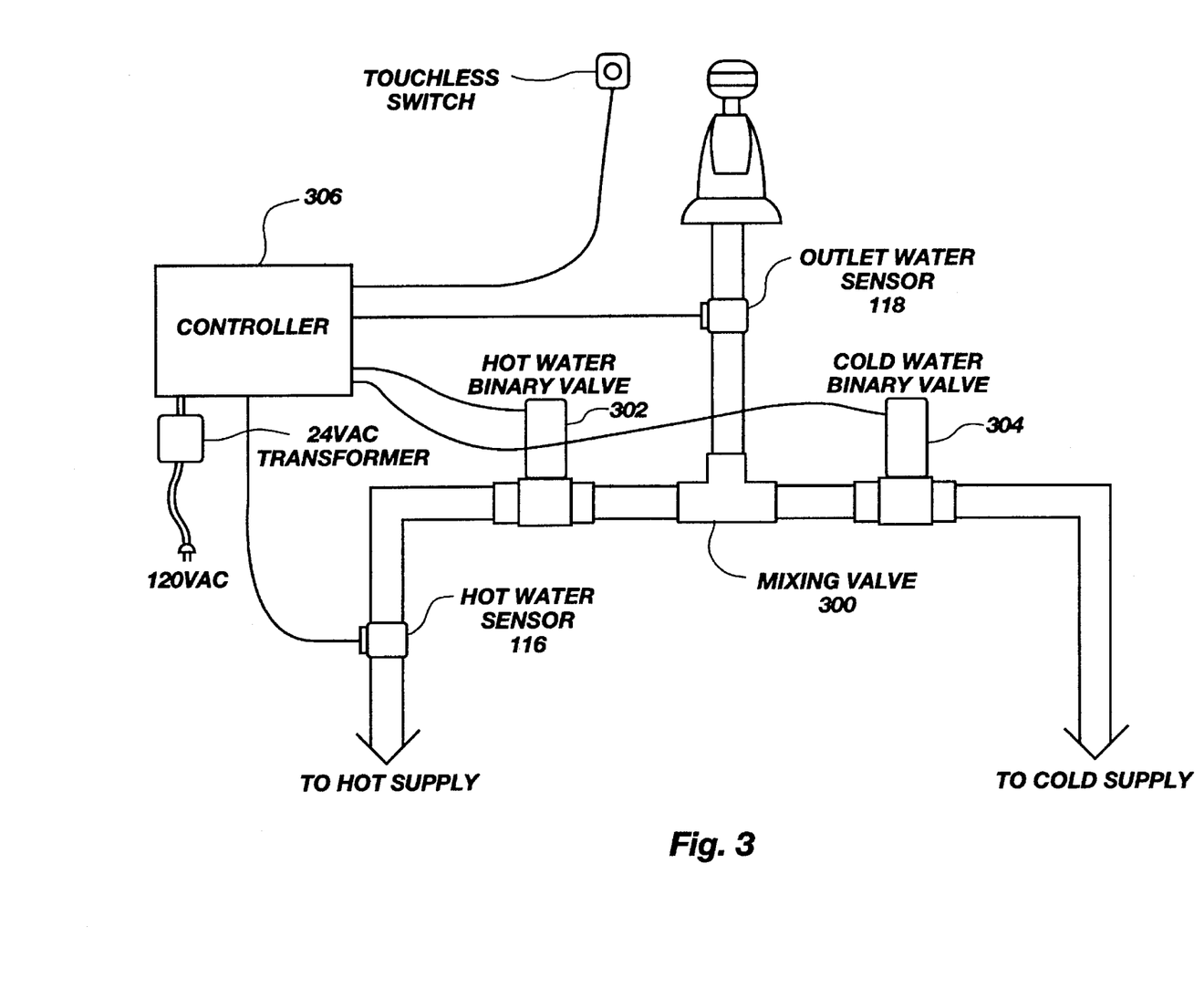
FIG. 3 is a schematic diagram of an alternate embodiment of the faucet system.

FIG. 3 illustrates an alternate, less expensive embodiment substitutes a proportioning or mixing valve 300 in combination with hot water and cold water binary valves (valves operable only between an "on" state and an "off" state) for the temperature selector 114 and the variable-flow hot and cold water valves 108, 110 (FIG. 1). Also, this embodiment lacks an outlet water temperature display. Further, the controller 306 of the embodiment of FIG. 3 is constructed somewhat differently. The proportioning valve 300 is in a permanently open state, and the relative flows of hot and cold water are fixed at the time of installation to provide a satisfactory mixture based on the average temperatures of water from the hot water supply (when the hot water is "up") and water from the cold water supply. For example, when both hot and cold water are "up", a mixture of 50% hot water and 50% cold water may produce outlet water which is comfortably warm. Since the proportion of hot to cold water flow is fixed, the controller compensates for the lag time of hot water arriving from the hot supply by opening only the hot water binary valve when either of temperatures A or B is too low. Once temperature A reaches the maximum temperature of water from the hot supply, or temperature B reaches the set temperature for which the proportioning valve is set, the controller opens the cold water valve 304, while keeping open the hot water binary valve 302.

In an alternate embodiment, the proportioning valve 300 could be eliminated and the controller 306 would then be constructed to operate the cold and hot water binary valves according to a duty cycle, the specific duty cycle being computed according to the sensed temperatures A or B. Still another embodiment would substitute a three-way control valve for the two binary valves.

In another alternate embodiment, the outlet water sensor is eliminated, and the controller only compares temperature A to the temperature of the hot water supply which is specified in the controller's memory. In this embodiment, the outlet temperature sensor 118 may be eliminated, or may function as a fail-safe. In the latter case, if temperature B rose above the preset temperature, as might occur if there were a failure of cold water flow, the controller would shut off hot water flow to prevent scalding of the user. A controller for the simplified embodiment which controls the valves only according to temperature A may operate according to the flow chart of FIG. 4.

Figure 4:
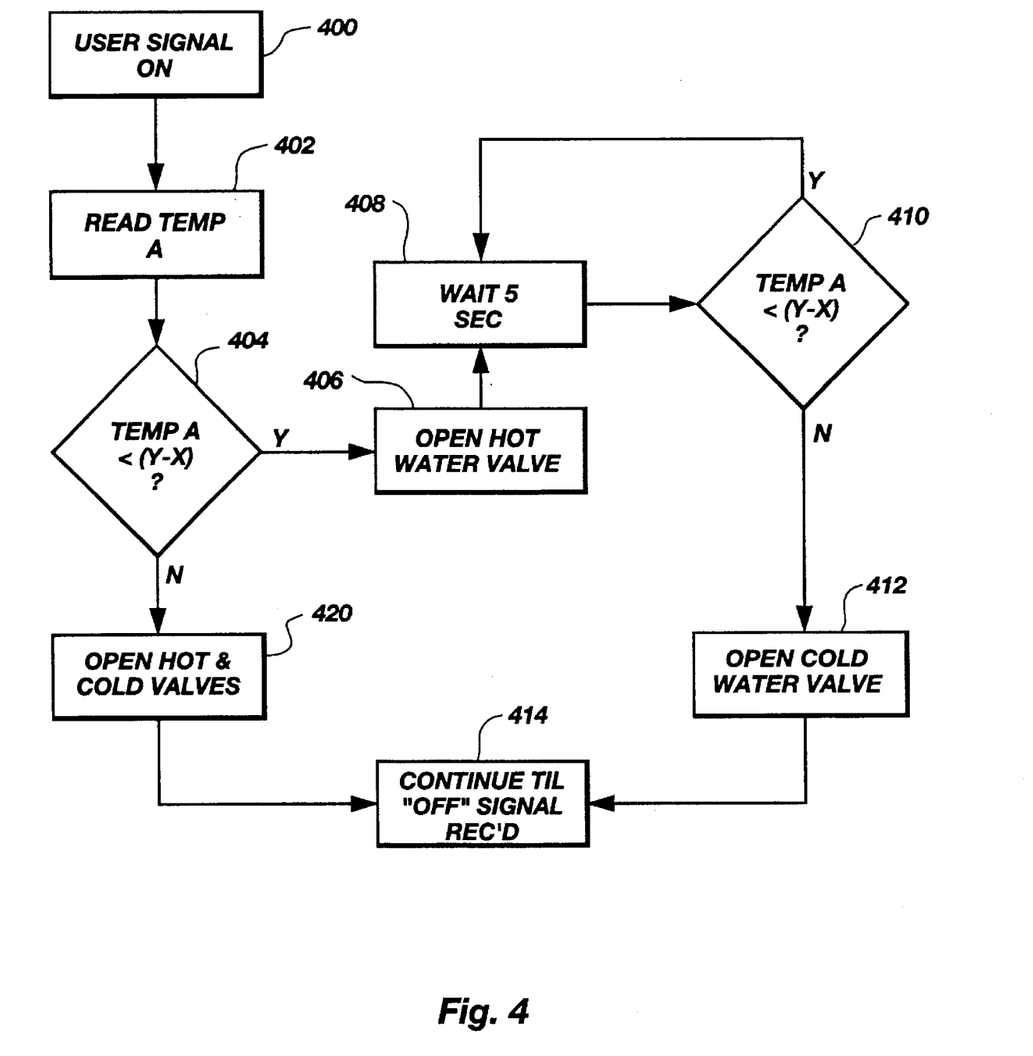
FIG. 4 is a flow chart of one embodiment of the operation of the apparatus of FIG. 3.

As seen in FIG. 4, when an "on" signal from the touchless switch is received by the controller (step 400), the controller first reads the temperature of the hot water line sensor 116, that is, temperature A (step 402), and asks whether temperature A is more than X degrees Fahrenheit below the temperature Y of the hot water supply specified in the controller's memory (step 404). If the answer is "yes", the controller opens only the hot water valve (step 406). The controller then reads temperature A again and again asks whether temperature A is more than X degrees lower than temperature Y (step 410). If the answer is "no", the controller opens the cold water valve (step 412). After step 412, the controller continues to hold both the hot and cold water binary valves open until an "off" signal is received (step 414), after which both the hot and cold valves are closed (step 416). If the answer in step 410 is "yes", the controller repeats steps 408 and 410 in sequence until the answer in step 410 is "no".

If in step 404 the answer is "no", the controller opens both the hot and cold water valves (step 420). The controller then goes to steps 414 and 416.

An "off" signal may be a signal generated by the touchless switch, or it may be generated by a timer associated with the controller which begins to count a preset interval when an "on" signal is received from the touchless switch. An "off" signal may comprise one of the following conditions: a) the infra-red signal does not sense the presence of a user and b) the indicated temperature set point has been reached, or c) a preset time limit has been reached.

Figure 5:
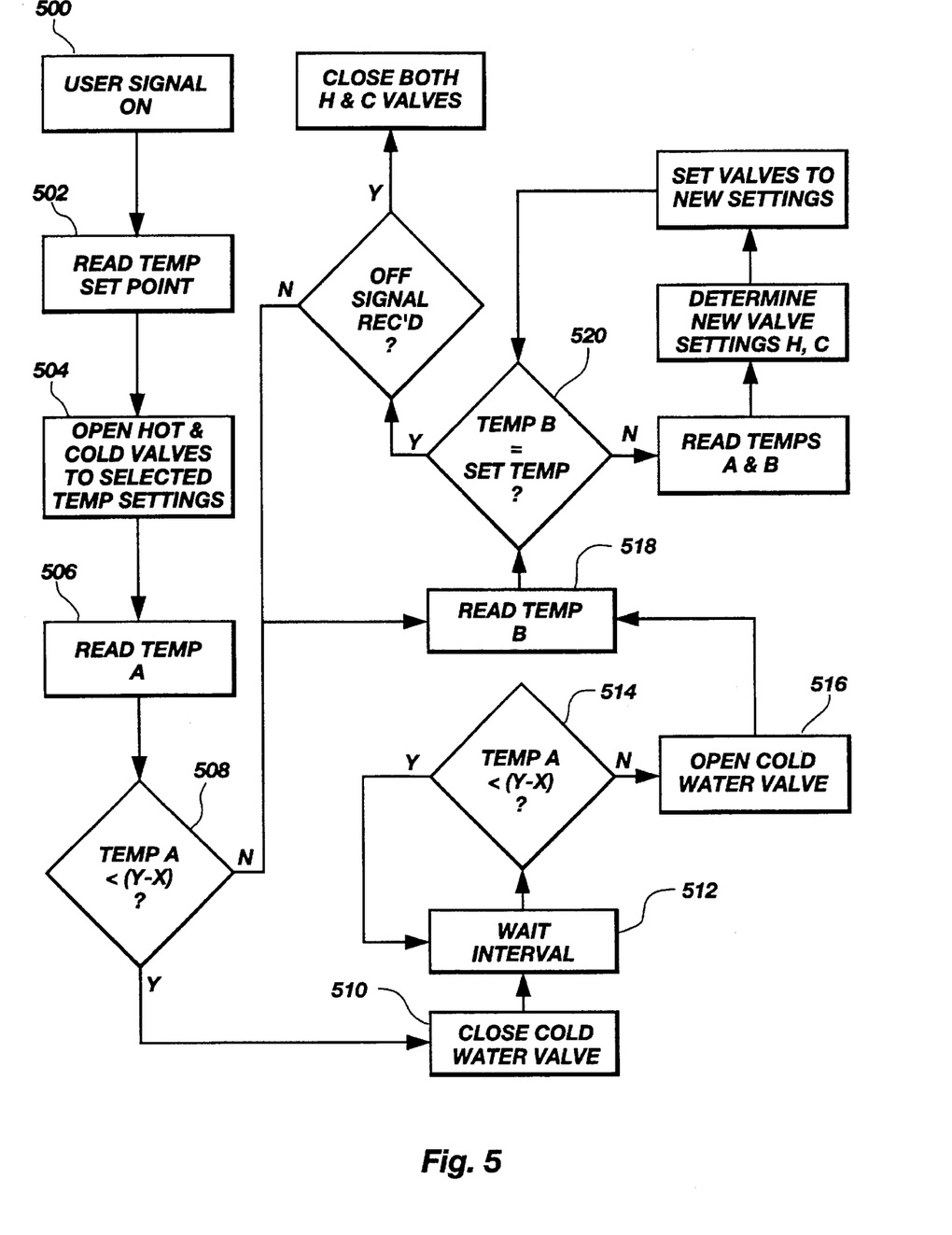
FIG. 5 is a flow chart of an alternate embodiment of the operation of the apparatus of FIG. 1.

In still another embodiment, the controller is constructed to first open both the hot and cold water valves upon receiving an "on" signal, and then performs the temperature checking functions. Both controller 120 and controller 306 can be configured to execute the temperature control functions according to this method; FIG. 5 depicts the method as it would be executed by controller 120 of the apparatus shown in FIG. 1. In this control path, the first step 502 following the receipt of an "on" signal is to check the selected output temperature, and open the hot and cold valves to the baseline settings for that selected temperature (step 504). Next, the controller checks the hot water temperature A, and asks whether it is more than 2 degrees below the expected hot water source temperature to achieve temperature B (steps 506, 508). If "yes", the controller rams the cold water valve off (step 510), and continues with only the hot water valve, open to its original setting, for a preset interval of two minutes (step 512).

The preset interval need not be two minutes. The hot-only flow interval may be based on the time usually required for hot water to reach sensor A from the hot water source, and in preferred embodiments may be user-selectable at the time of manufacture or installation. For example, an interval as short as a few milliseconds, or less. Or, the controller could be constructed to keep the cold water valve closed until temperature B reaches the set temperature for the outlet water.

After step 5 12, the controller then again asks whether temperature A is more than 2 degrees below the expected hot water source temperature (step 514), and if "no", the controller opens the cold water valve to the original setting (step 516). The controller then reads temperature B, and asks if temperature B is within 2 degrees of the set temperature (steps 518, 520). If yes, the controller continues to operate at the original settings until an "off" signal is received. If the answer is "no", the controller goes through a sequence of calculating new valve settings, setting the valves to the new settings, and rechecking temperature B, until temperature B reaches the set temperature.

It is desirable that a fail-safe mechanism be built into either the controller programming, or as a separate, outside mechanism, which will cause all water to shut off if temperature B reaches a temperature of more than 5 degrees above the set temperature, or a selected upper limit temperature, to prevent scalding incidents.

Of course this same computer logic may be used to mix gases as well as liquids by simply using control values specifically designed for use with gases by volume rather than liquids by temperature and modifying the sensors accordingly. For instance mixing nitrous oxide ($N_2O$) with oxygen ($O_2$) by use of this system at a predetermined level might be efficacious in dentistry and surgery as well as beneficial in preventing needless death if the device was preset to never allow a setting centering less than 20% oxygen to occur.

The device could even be designed to occur within one canister or tank which accurately mixed the oxygen and nitrous oxide at a preset level rather than the two separate tank systems containing either pure nitrous oxide and pure oxygen which are used today.

It will be apparent that numerous modifications may be made to the apparatus, to the construction of the controller, and to the method of temperature regulation without departing from the concepts embodied in this application. The claims themselves define the scope of that which the inventor regards as his invention.

What is claimed is:

1. A temperature-regulating automatic faucet apparatus comprising;

a spout for delivering water to a user location;

a hot water supply line having a hot water valve controlling the flow of hot water therefrom;

a cold water supply line having a cold water valve controlling the flow of cold water therefrom;

a mixing region connected to said hot water supply line and to said cold water supply line upstream of said spout and downstream of said cold water valve and said hot water valve;

a first temperature sensor located to sense the temperature of hot water within said hot water supply line upstream of said mixing region, and constructed to output a first temperature signal indicative thereof; and a proportioning valve downstream of said hot water supply line and said cold water supply line and upstream of said mixing region for providing fixed hot and cold water;

an automatic sensor disposed to detect an object placed in a signal location, and constructed to generate a user presence signal indicative of the presence of an object in the signal location; and control means for receiving said user presence signal, reading said first temperature signal, controlling said hot water valve and said cold water valve according to said first temperature signal in response to said user presence signal, said control means having an internal memory and being capable of providing a disproportionately higher flow from said hot water valve when said first temperature signal indicates a temperature below a hot water supply temperature specified in said internal memory.

2. The faucet apparatus of claim 1, which further includes a second temperature sensor located to sense the temperature of water in said mixing region and constructed to output a second temperature signal reflective thereof, and wherein said controller is further constructed to control said hot and cold water valves in accordance with said second temperature signal.

3. The faucet apparatus of claim 2, wherein said hot water control valves and said cold water control valves are both configured as variable flow valves responsive to said control means to produce respective hot and cold flow rates specified by said control means, and wherein said control means is further constructed to vary said respective specified flow rates of said hot and cold water valves according to the temperature sensed in said hot water line and the temperature sensed in said mixing region to achieve a preset temperature in said mixing region.

4. The faucet apparatus of claim 3, which further includes temperature set means operably linked to said controller and positioned for operation by a user to select a desired output temperature.

5. The faucet apparatus of claim 4, wherein said temperature set means includes a multiposition switch constructed for manual operation.

6. The faucet apparatus of claim 4, further including temperature display means operably linked to said second temperature sensor for displaying a temperature reflective of said second temperature signal.

7. A method for automatically regulating the temperature of output water from a faucet apparatus having a hot water supply line and a cold water supply line respectively connected to provide hot and cold water to a mixing zone upstream of an outlet, and a switch for activating output of water from the outlet, the method comprising the steps of:

a. providing a variable-flow hot water valve and a hot water temperature sensor in the hot water supply line upstream of the mixing zone;

b. providing an output water temperature sensor disposed between the mixing zone and the outlet;

c. providing a variable-flow cold water valve in the cold water supply line upstream of the mixing zone;

d. receiving a signal from the switch indicating that water flow is to be activated;

e. reading the hot water temperature sensor;

f. computing respective settings for the cold water valve and the hot water valve to provide flows of hot and cold water to the mixing zone to achieve a preset temperature of the output water;

g. setting the cold water valve and the hot water valve to the respective settings;

h. reading the temperature sensed by the output water sensor;

i. comparing the output water temperature to the preset temperature;

j. if the output water temperature differs significantly from the preset temperature, performing the following substeps:

1. taking an updated reading of temperature from the hot water sensor;

2. calculating a new set of respective hot and cold water valve settings from the updated reading;

3. re-setting the hot and cold water valves to the new set of settings; and       4. repeating steps (h.)–(j.) in sequence until the switch is operated to deactivate the flow of water.

k. holding the cold and hot water valves at the respective settings until a signal is received from the switch indicating that output water flow is to be stopped.

8. The method of claim 7, wherein the switch is a touchless switch.

9. In an automatic faucet apparatus including a hot water valve installed in a hot water supply line, a cold water valve installed in a cold water supply line, a mixing zone connecting the hot water line and the cold water line downstream of the hot water valve and the cold water valve, an outlet downstream of the mixing zone, and an automatic sensor connected to the hot water valve and the cold water valve, and constructed for touchless activation of the hot and cold valves to deliver output water through the outlet via the mixing zone, improved temperature regulating means for regulating temperature in the output water comprising:

a first temperature sensor located in the hot water supply line upstream of the hot water valve, and providing a first signal reflective of the temperature sensed therein;

a controller connected to said first temperature sensor to receive a first signal therefrom, and to the hot water valve and the cold water valve to control the amounts of hot and cold water flowing respectively from the hot and cold water valves, said controller constructed to:

compute settings of the hot and cold water valves to achieve a preselected temperature of output water,      open the hot and cold water valves to the computed settings in response to an "on" signal received from the touchless switch,      read said first signal and compare it to a hot water value reflective of an expected hot water source temperature, and, if said first signal is unacceptably below said hot water value, to re-set the cold water valve to provide reduced cold water flow, and      reset the cold water flow to the computed setting when the temperature sensed by the first temperature sensor reaches the expected hot water temperature.

10. The improvement of claim 9, further including a second temperature sensor located proximal the outlet for providing a second signal reflective of the temperature of the outlet water, and wherein said controller is further constructed to    read said second signal and compare it to a set temperature value reflective of the preselected temperature, and, if said second signal is unacceptably below said preselected temperature, to recompute the hot and cold water valve settings, and re-set the hot and cold water valves to the recomputed settings.

\* \* \* \* \*